United States Patent
Caillet et al.

(10) Patent No.: US 9,272,768 B2
(45) Date of Patent: Mar. 1, 2016

(54) SOUNDPROOFING CLADDING PANEL, AND AN AIRCRAFT

(71) Applicant: AIRBUS HELICOPTERS, Marignane, Cedex (FR)

(72) Inventors: Julien Caillet, Bouc Bel Air (FR); Helene Sibois, Les Pennes Mirabeau (FR); Jean-Pierre Fabrizio, Marseille (FR); Egle Knor, Munich (DE)

(73) Assignee: Airbus Helicopters, Marignane (FR)

( * ) Notice: Subject to any disclaimer, the term of this patent is extended or adjusted under 35 U.S.C. 154(b) by 0 days.

(21) Appl. No.: 14/547,484

(22) Filed: Nov. 19, 2014

(65) Prior Publication Data

US 2015/0144422 A1    May 28, 2015

(30) Foreign Application Priority Data

Nov. 26, 2013 (FR) ...................... 13 02736

(51) Int. Cl.
*B64C 1/40* (2006.01)
*G10K 11/168* (2006.01)
*B32B 7/04* (2006.01)
*B32B 3/26* (2006.01)

(52) U.S. Cl.
CPC . *B64C 1/40* (2013.01); *B32B 3/266* (2013.01); *B32B 7/045* (2013.01); *G10K 11/168* (2013.01); *B32B 2307/102* (2013.01)

(58) Field of Classification Search
CPC ............ B64C 1/40; B32B 3/266; B32B 7/045
USPC ........................... 181/213, 214, 286, 290, 292
See application file for complete search history.

(56) References Cited

U.S. PATENT DOCUMENTS

| 4,416,349 A | * | 11/1983 | Jacobs | ................... G10K 11/16 |
| | | | | 181/208 |
| 4,425,980 A | * | 1/1984 | Miles | ........................ B64C 1/40 |
| | | | | 181/208 |
| 5,360,500 A | | 11/1994 | Evans et al. | |

(Continued)

FOREIGN PATENT DOCUMENTS

| EP | 0894617 | 2/1999 |
| FR | 2894539 | 6/2007 |

(Continued)

OTHER PUBLICATIONS

French Search Report for FR 1302736, Completed by the French Patent Office on Jul. 17, 2014, 8 Pages.

(Continued)

*Primary Examiner* — Jeremy Luks
(74) *Attorney, Agent, or Firm* — Brooks Kushman P.C

(57) ABSTRACT

A self-supporting acoustic insulation panel (1) comprising a visible wall (3) that is not self-supporting and an invisible wall (2) that is not self-supporting facing a source (50) of soundwaves. A porous core (20) is arranged between the visible wall (3) and the invisible wall (2), a plurality of link elements (5) each extending from the invisible wall (2) towards the visible wall (3), each link element (5) passing through an orifice (21) in said core (20) and being connected to the visible wall (3) and to the invisible wall (2), each link element (5) separating the visible wall (3) from the invisible wall (2) and mechanically linking the visible wall (3) with the invisible wall (2) while acoustically decoupling the visible wall (3) from the invisible wall (2).

20 Claims, 3 Drawing Sheets

(56) References Cited

U.S. PATENT DOCUMENTS

| | | | |
|---|---|---|---|
| 5,706,249 | A | 1/1998 | Cushman |
| 6,202,786 | B1 | 3/2001 | Pfaffelhuber et al. |
| 6,274,219 | B1 | 8/2001 | Schuster et al. |
| 8,640,825 | B2 * | 2/2014 | Vauchel ............... F02K 1/827 181/222 |
| 8,657,067 | B1 | 2/2014 | Mathur |
| 2009/0065290 | A1 * | 3/2009 | Kim ..................... E04B 1/86 181/141 |
| 2011/0091673 | A1 | | 4/2011 Luger et al. |
| 2012/0125710 | A1 | | 5/2012 Fisk et al. |
| 2013/0075193 | A1 | | 3/2013 Vavalle |
| 2013/0328440 | A1 | | 12/2013 Kornbluh et al. |

FOREIGN PATENT DOCUMENTS

| | | |
|---|---|---|
| FR | 2939406 | 6/2010 |
| GB | 2462373 | 2/2010 |

OTHER PUBLICATIONS

European Search Report Dated Jun. 24, 2015, Application No. EP 15 00 0010, 7 Pages.

* cited by examiner

SOUNDPROOFING CLADDING PANEL, AND AN AIRCRAFT

CROSS REFERENCE TO RELATED APPLICATION

This application claims priority to French patent application No. FR 13 02736 filed on Nov. 26, 2013, the disclosure of which is incorporated in its entirety by reference herein.

BACKGROUND OF THE INVENTION (1) Field of the Invention

The present invention relates to a soundproofing cladding panel, and to an aircraft including such a panel.

The invention is thus situated in the field of treating acoustic nuisance on board an aircraft.

(2) Description of Related Art

The present invention relates more particularly to systems for treating noise. Reducing the sound level of noise is a problem that is increasing because of the impacts of noise on people's comfort and health. This problem is encountered, particularly but not exclusively, in the technical field of aircraft, and in particular of rotary wing aircraft.

A rotary wing aircraft comprises at least one lift rotor that is driven in rotation by a drive train. The drive train may include at least one engine and at least one main gearbox (MGB) interposed between the engine and the lift rotor.

Furthermore, an aircraft may include movable mechanical member for cooling equipment on board the aircraft, and in particular the main gearbox and also electronic equipment. Movable mechanical members can also be used for delivering air to a cabin. Conventionally, a fan is used for cooling equipment and/or for moving a mass of air.

Thus, an aircraft generally has multiple sources of noise, e.g. including one or more rotors, a main gearbox, and blades of turboshaft engines or indeed of fans.

Under such circumstances, these noise sources on a rotorcraft can cover the entire spectrum of frequencies that are audible to humans. This frequency spectrum conventionally extends from audible noise having a frequency component of about 20 hertz (Hz) to audible noise having a frequency component of about 20 kilohertz (kHz).

Consequently, an aircraft may be fitted with active and/or passive devices for performing sound reduction.

In particular, a structural panel of an aircraft and/or a cladding panel of the aircraft can be designed to optimize the acoustic comfort of occupants of the aircraft. An aircraft panel can then specifically have the function of providing acoustic insulation or acoustic damping depending on the strategy followed, while also having the requisite mechanical strength.

In a first known embodiment, a cladding panel is provided with at least one wall made of composite materials. For example, it is possible to use an epoxy matrix reinforced by woven fibers.

In a first variant, the panel may comprise a monolithic wall.

In a second variant, the panel may comprise two walls sandwiching a core, e.g. a honeycomb core.

That first known embodiment thus seeks to provide a cladding panel made of composite materials.

That first known embodiment presents the advantage of making it possible to obtain a panel presenting stiffness and strength that are sufficient to comply with aircraft certification regulations, e.g. being capable of withstanding the loads to which they might be subjected in flight or during a crash.

The panel can then be a self-supporting panel suitable for carrying equipment.

The term "self-supporting" when used with a panel or a wall designates a panel or a wall presenting some minimum amount of stiffness so as to be capable of generally retaining its shape under levels of stress as predetermined by the manufacturer, such as the levels of stress to which a cladding panel is usually subjected on board an aircraft (vibration, supporting passengers, small impacts), or indeed for carrying small pieces of equipment with as few fastener points as possible.

Furthermore, the panels that are obtained are relatively light in weight, given that weight is usually an important parameter for an aircraft.

An aircraft manufacturer is then inclined towards fabricating cladding panels out of composite materials. Nevertheless, such a cladding panel made of composite materials may present a fabrication cost that is relatively high.

In a second known embodiment, a panel may have a single wall obtained using relatively inexpensive methods, such as forming or molding methods that use small amounts of polymer without any woven fibers. By way of example, the wall of a panel may be made using a component made of thermoformed polymer, or a stamped sheet, or indeed made of plastics material that has been injected into a mold.

Nevertheless, for equal weight, a panel of the second known embodiment presents stiffness that is less than that of a panel of the first known embodiment.

Making a panel of the second known embodiment that is self-supporting therefore leads to a panel that is relatively heavy. The thickness of a panel of the second known embodiment needs to be maximized in order to impart a self-supporting nature to the panel.

From an acoustic insulation point of view, a panel presents a capacity for acoustic insulation that generally complies with a "mass" relationship in the range of frequencies that have an impact on an individual's hearing comfort. Such a mass relationship specifies that the ability of a panel to provide insulation as measured in decibels varies in proportion to the logarithm of the mass per unit area of the panel.

For equal stiffness, a panel of the second known embodiment thus presents better capacity for acoustic insulation than does a panel of the first known embodiment.

In addition, the insulation capacity of a cladding panel also depends on its critical vibration frequency.

At that critical frequency, the acoustic insulation of a panel becomes smaller. It is known that the critical frequency decreases with increasing stiffness of the panel. Under such circumstances, for equal weight, a panel made of polycarbonate presents a critical frequency that is higher than the critical frequency of a panel made of composite materials.

The critical frequency of a polycarbonate panel may then lie outside the audible frequency range.

A manufacturer is then confronted with a difficult choice for optimizing the sound comfort of an occupant of an aircraft. It would be advantageous to make a cladding panel of the second known embodiment in order to move the critical frequency of the panel away from the audible frequency range. Nevertheless, such a panel runs the risk of not having sufficient mechanical strength to be self-supporting.

If the manufacturer selects the first known embodiment for the purpose of stiffening the panel, the manufacturer then obtains a panel that is more expensive and that runs the risk of having a critical frequency that is troublesome.

Fabricating a cladding panel can thus involve a compromise that is difficult to resolve in satisfactory manner.

It can be understood that an acoustic insulation panel cannot be considered as being a mere assembly of one or more conventional walls.

In order to improve acoustic insulation, and in particular in order to treat noise present at high frequencies, i.e. frequencies higher than 1000 Hz, for example, a panel may have two walls that are decoupled.

Document FR 2 939 406 suggests interposing a foam between two walls in order to decouple those two walls. The decoupling seeks to avoid transmitting vibration from a first wall that is excited by noise to a second wall.

The foam may optionally include inserts to prevent it from sagging.

The acoustic performance of the panel is then not necessarily associated with a mass relationship.

Nevertheless, it can be difficult to implement panels of the same type as the above-described second known embodiment. Decoupling the walls requires the use of walls that are thick in order to impart acceptable mechanical strength to the panel, with the corollary of being too heavy.

The first wall may comprise a sandwich structure of composite materials for imparting a self-supporting nature to the panel, with the second wall possibly being a flexible wall. Given the mass relationship, the panel must nevertheless be of considerable thickness in order to present sufficient mass to obtain good insulation.

The cost of producing such a panel may also be relatively high.

In a first strategy, a manufacturer may decide to treat noise by using an insulating panel in order to prevent the panel transmitting noise that has been transmitted thereto.

The invention seeks to provide such an insulating panel.

In a second strategy, the panel acts by damping rather than insulating, seeking to dissipate noise that has been transmitted to the panel.

Documents FR 2 894 539 and EP 0 894 617 appear to relate to damping panels.

Document FR 2 894 539 describes a panel having a porous top shell and a leakproof bottom shell provided with at least one housing. The panel then presents at least one cavity defined by the wall of a housing and the facing zone of the top shell. Noise can then pass through the top shell so as to be damped in the cavity.

Document EP 0 894 617 describes a panel having covering and/or decorative layers covering two opposite sides of a non-woven support. That support is penetrated by prism-shaped zones connected to the covering and/or decoration layers. A covering layer may be porous.

Furthermore, Document US 2011/091673 describes a body having two walls and a foam shaped in a mold. The mold thus deforms at least one of the walls and the foam.

Document GB 2 462 373 describes a covering for an automobile.

BRIEF SUMMARY OF THE INVENTION

An object of the present invention is to propose a self-supporting panel of minimized weight that is acoustically insulating.

According to the invention, a self-supporting acoustic insulation panel comprises:
  a visible wall facing a location to be acoustically insulated, said visible wall being non-self-supporting;
  an invisible wall facing a source of soundwaves, said invisible wall being non-self-supporting;
  a porous core arranged between the visible wall and the invisible wall; and
  a plurality of link elements, each link element extending from the invisible wall towards the visible wall, each link element passing through an orifice in said core and being connected to the visible wall and to the invisible wall, each link element separating the visible wall from the invisible wall and mechanically linking the visible wall and the invisible wall together while acoustically decoupling the visible wall from the invisible wall.

The resulting panel is thus a self-supporting panel of low weight designed to acoustically insulate a soundwave source.

Such a panel thus does not seek to have cavities and housings for dissipating a soundwave, but rather presents a structure that seeks to insulate such soundwaves.

The panel of the invention seeks to define a cladding panel, e.g. presenting acceptable sound insulation performance that is compatible with the weight and thickness requirements that are generally encountered on aircraft.

The panel is the result of assembling two walls, e.g. parallel walls, that are separated from each other by a space. The space receives a porous material, e.g. an open-celled foam and/or a felt. The porous material is selected to present good sound absorption characteristics (porosity, tortuosity, resistance to passing air) and low stiffness in order to limit the transmission of vibration via its skeleton.

The panel is provided more particularly with an assembly of four types of element.

The first type of element is visible to a person. The first type of element thus comprises the so-called "visible" wall of the panel. The visible wall may be formed or molded using techniques that are inexpensive, e.g. being obtained by thermoforming, by injection, by polymerization, or by bending in a mold so as to obtain the desired shape.

The second type of element is the so-called "invisible" wall that is not situated on the side of the panel beside a person, but on the contrary on the side of the panel beside a source of noise. The invisible wall may be fabricated using the same method and/or the same materials as the visible wall, or indeed using a method and/or materials that differ from those used for the visible wall.

In particular, the visible and/or invisible walls need not be self-supporting on their own, given that they are obtained by methods that are inexpensive.

The third type of element comprises link elements that link together and space apart the visible and invisible walls. Consequently, the link elements serve to improve the mechanical strength of the panel and to make it self-supporting by holding the visible and invisible walls apart from each other.

Under such circumstances, it becomes possible to use walls of small thickness made using materials that need not be composite, unlike the walls of the same type as the second known embodiment which involves obtaining a large thickness leading to considerable extra weight.

Each wall can thus be a "composite" wall obtained using a matrix having possibly inexpensive reinforcement embedded therein, or using transformation methods that are inexpensive. Nevertheless, each wall may equally well be a "non-composite" wall that does not have any reinforcement and that has a fabrication cost that is low.

The quantity, position, and orientation of the link elements are optimized as a function of the shape of the panel. There are as few link elements as possible in order to limit the transfer of vibration between the visible wall and the invisible wall, and the link elements should be spaced apart as much as possible in order to decouple the visible and invisible walls.

The invention thus proposes obtaining a self-supporting panel with the help of walls that are mechanically linked together, but that nevertheless remain decoupled acoustically, which appears to be contradictory.

This structure thus possesses weight that is minimized. Such a minimized weight then appears to go against obtaining good acoustic insulation in application of the mass relationship.

The fourth type of element is represented by the core of the panel. This core has orifices matching the positions of the link elements so as to avoid being compressed. Orifices in the core thus have the link elements passing therethrough.

The final assembly of the four elements is performed by connecting the fastener elements to the visible wall and to the invisible wall.

When the invisible wall is excited by a soundwave, the panel functions as a mass-spring-mass system, each wall representing a vibrating mass, while the space between the walls receiving the core acts as a spring.

In spite of the presence of the link elements, the visible wall is decoupled from the invisible wall, thereby at least limiting any transmission to the visible wall of the vibration to which the invisible wall is subjected. The panel is thus acoustically insulating. Specifically, the number of link elements is minimized in order to avoid coupling between the visible and invisible walls. Surprisingly, this number can be optimized both to impart the required mechanical strength to the panel for making it self-supporting, and also to decouple the visible wall acoustically from the invisible wall, even thought that appears to be contradictory.

The acoustic behavior of the panel thus no longer complies with the mass relationship. The acoustic insulation provided is particularly perceptible at high or indeed medium frequencies.

The panel thus tends to present advantageous acoustic performance while also presenting a fabrication cost that can be small, depending on the techniques selected for fabricating the visible and invisible walls.

Furthermore, the weight of the panel is small since it does not necessarily require walls that are thick and heavy.

In particular, each panel may present a weight per unit area that is small, e.g. lying in the range 2 kilograms per square meter ($kg/m^2$) to 5 $kg/m^2$. In application of the above-described mass relationship, the acoustic performance of the panel ought to be modest. Nevertheless, the link elements do not prevent vibratory behavior being decoupled between the visible and invisible walls. At high frequencies in particular, the panel therefore no longer complies with the mass relationship.

Furthermore, link damper means fasten at least one end of a link element to one of said visible and invisible walls.

The damper means may comprise an adhesive. Any type of adhesive may be used, e.g. an adhesive in paste or liquid form, a mastic, adhesive tapes, . . . .

Thus, one end of a link element may adhere to a wall by means of a damping adhesive, while the other end of the link element is incorporated in the other wall.

Each end of a link element may also be secured to a wall by adhesive.

The use of link damper means enhances decoupling between the walls of the panel so as to limit the transmission of vibration from the invisible wall to the visible wall, and consequently limits the generation of noise radiated by the visible wall.

The panel may also include one or more of the following characteristics.

By way of example, said core is a foam optionally having a plurality of orifices passing right through a thickness of said foam, said thickness of said foam representing the dimension of the foam between the invisible wall and the visible wall.

As a variant, or in addition, said core is a felt having a plurality of orifices passing right through a thickness of the felt, said thickness of the felt representing the dimension of the felt between the invisible wall and the visible wall.

Thus, the core may be made of foam and/or felt, and may include orifices through which the link elements pass.

The term "felt" is used to mean any material having fibers that are relatively flexible with large amounts of space around the fibers. By way of example, a felt may be constituted by the material commonly referred to as glass wool.

Furthermore, said core is optionally not secured to the visible wall or to the invisible wall.

Preferably, the core thus adheres neither to the visible wall nor to the invisible wall in order to limit any solid-to-solid contact between the core and the visible and invisible walls, for the purpose of improving the overall behavior of the panel.

In addition, one of said visible and invisible walls referred to as the "first" wall may incorporate the link elements, the other wall that is not provided with the link element being referred to as a "second" wall. The first wall has an inner surface facing another inner surface of the second wall, and each link element is an elongate element projecting from the first wall and extending from the inner surface of the first wall towards the inner surface of the second wall.

Advantageously, the invisible wall is fabricated so as to incorporate the link elements, which have the function of spacing apart and linking together the visible and invisible walls. These link elements thus make it possible to guarantee the mechanical behavior of the panel.

The link elements are preferably made when making the invisible wall. In a molding technique, the link elements can be obtained with the help of hollow spikes present in the mold used for fabricating the invisible wall.

Such link elements may thus be integral with one of the walls of the panel, being component portions of that wall.

Alternatively, the link elements may be separate pieces fitted to the invisible wall, by being secured or adhesively bonded thereto.

Furthermore, two adjacent link elements are spaced apart by a predetermined distance between link elements that is greater than a minimum threshold.

By way of example, the minimum threshold is equal to 15 centimeters (cm).

The minimum threshold makes it possible to guarantee sufficient decoupling to obtain perceptible acoustic performance as from medium frequencies. Below this threshold, decoupling is less significant.

The minimum threshold may depend on the thickness of the space between the visible wall and the invisible wall, and on the masses of the visible and invisible walls.

Furthermore, two adjacent link elements may be spaced apart by a predetermined distance between link elements that is less than a maximum threshold.

This maximum threshold may be equal to 50 cm.

The maximum threshold serves to guarantee that the panel possesses acceptable mechanical strength.

The values of the minimum and maximum thresholds may for example be determined as a function of the materials (thickness, stiffness) constituting the visible wall and the invisible wall.

In another aspect, the visible wall and the invisible wall are walls that have been machined or molded by a non-manual forming method.

The cost of fabricating the panel is then very low.

Such conventional methods require thick walls to be constructed in order to obtain a panel that is rigid. Nevertheless, the invention makes it possible to obviate that drawback by providing link elements that link together the walls of the panel but without that leading to coupling between the visible and invisible walls.

The walls may be made of organic materials based essentially on atoms of carbon, such as for example thermosetting or thermoplastic polymers belonging to the epoxy, polyester, polyurethane, polyethylene (PE), polypropylene (PP), polyamide (PA), polycarbonate (PC), polyetherimide (PEI), etc. families.

The organic materials used may optionally be reinforced, e.g. by fibers or fillers that may be organic, natural or artificial, inorganic, or metallic, such as glass, carbon, hemp, aluminum, etc. . . . .

For example, the visible wall may comprise a reinforced organic material. For example, the visible wall may comprise a composite material comprising carbon reinforcement and a thermoplastic or thermosetting resin. The visible wall may then be shaped by stamping or by forming in a stove or an autoclave.

The visible wall may also comprise an organic material that is not reinforced (e.g. of the PC, PA, or PE thermoplastic type), but also a thermosetting material type such as epoxy. Such a solution is generally heavier than the composite solution, but it is less expensive.

Furthermore, the material may be colored in its mass, and it may be grained or textured on its surface.

Consequently, at least one of said visible and invisible walls is optionally a wall made of thermoformed polymer.

Furthermore, the core may present thickness that is less than the length of the link elements, the thickness representing the dimension of the core between the visible wall and the invisible wall, the length representing the dimension of a link element between the visible wall and the invisible wall.

This characteristic seeks to avoid flattening the core so as to avoid degrading the decoupling between the visible and invisible walls.

Furthermore, the visible wall may be micro-perforated.

The visible wall may also be grained and/or microperforated so as to improve the appearance and/or the acoustic absorption of the panel. Likewise, decorative films may be applied to the visible wall.

The invention also provides an aircraft including a panel of the above-described type.

BRIEF DESCRIPTION OF THE SEVERAL VIEWS OF THE DRAWINGS

The invention and its advantages appear in greater detail from the context of the following description of examples given by way of illustration and with reference to the accompanying figures, in which.

DETAILED DESCRIPTION OF THE INVENTION

Elements present in more than one of the figures are given the same references in each of them.

It should be observed that three mutually orthogonal directions X, Y, and Z are shown in some of the figures.

The direction X is said to be longitudinal and another direction Y is said to be transverse. Finally, a third direction Z is said to be in elevation and corresponds to the height dimensions of the structures described. The term "thickness" then relates to a dimension in elevation of the device in this elevation direction.

Figure 1:
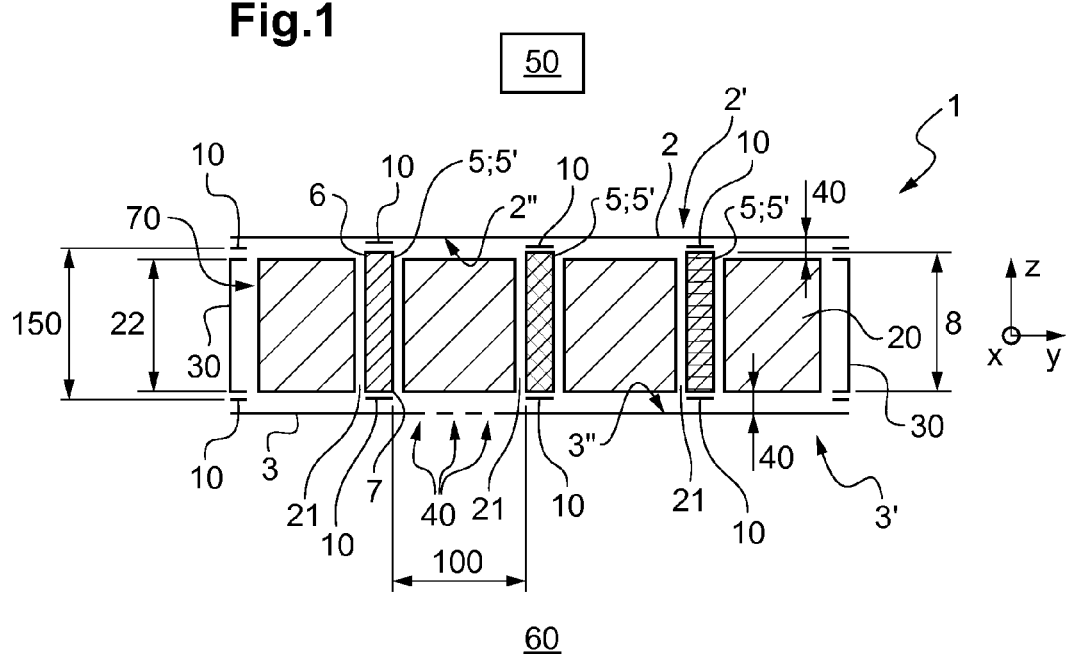
FIG. 1 is a section of a panel having fastener elements fastened to the visible wall and to the invisible wall.

FIG. 1 shows an aircraft having a panel 1. The other members of the aircraft are not shown in order to avoid pointlessly cluttering the figure.

The panel 1 has a wall referred to as an "invisible" wall 2 and another wall referred to as a "visible" wall 3.

Under such circumstances the invisible wall 2 faces a noise source 50, whereas conversely the visible wall 3 faces a location 60 that is to be acoustically insulated from the noise source 50. This location may be an aircraft cabin, in particular.

The invisible wall 2 has an outer first surface 2' facing towards the noise source 50 and an inner first surface 2" facing towards an inter-wall space of the panel. The visible wall 3 then has an outer second surface 3' facing towards the location 60 for insulating and an inner second surface 3" facing towards the inter-wall space of the panel.

The invisible wall 2 and the visible wall 3 are mutually parallel in the embodiment of FIG. 1. Although FIG. 1 shows a panel that is plane, each wall could present a shape that is not plane.

The invisible wall 2 and the visible wall 3 both extend longitudinally and transversely over large dimensions, and in elevation in their thickness directions.

The invisible wall 2 and the visible wall 3 are not self-supporting. Consequently, the invisible wall 2 and the visible wall 3 are made using a material, e.g. an organic material, presenting thickness that is not sufficient for giving the wall sufficient bending stiffness to make it self-supporting.

Consequently, the weights of the invisible wall 2 and of the visible wall 3 can be minimized. In particular, the panel may have a visible wall 3 and/or an invisible wall 2 made of thin thermoformed polymer.

The visible wall 3 and the invisible wall 2 are optionally walls that have been machined or molded by a non-manual forming method, namely a method not requiring manual draping that is expensive in terms of labor time. Inexpensive conventional fabrication techniques can then be applied if the manufacturer seeks to optimize fabrication costs.

In addition, the visible wall 3 may include microperforations 40 opening out to the location 60 for insulating acoustically and to an inter-wall space 70 situated between the invisible wall 2 and the visible wall 3.

Furthermore, the panel 1 may have a core 20 made of foam and/or felt that is arranged in the inter-wall space 70 of the panel.

Advantageously, the core 20 is separated from the visible wall 3 and/or from the invisible wall 2 in order to limit the transmission of vibration from the invisible wall 2 to the visible wall 3.

Thus, the core 20 seeks to avoid impeding relative movement between the invisible wall and the visible wall.

Consequently, the thickness 22 of the core 20 may be less than the thickness 150 of the inter-wall space 70 of the panel in order to avoid compressing the core between the invisible wall 2 and the visible wall 3. The thickness 22 of the core 20 represents the dimension of the core between the invisible wall 2 and the visible wall 3, namely in a direction in elevation that is orthogonal to the invisible wall 2 and to the visible wall 3. Likewise, the thickness 150 of the inter-wall space 70 represents the height between the invisible wall 2 and the visible wall 3, namely in an elevation direction orthogonal to the invisible wall 2 and the visible wall 3.

In order to obtain a panel that is rigid in bending with the help of potentially flexible walls, the panel presents a plurality of link elements 5, each extending from the invisible wall 2 towards the visible wall 3.

Under such circumstances, the core 20 is provided with one orifice 21 per link element 5. Each orifice 21 passes through the thickness 22 of the core in the elevation direction so as to open out towards the inner first surface 2" of the invisible wall 2 and towards the inner second surface 3" of the visible wall 3.

Thus, each link element 5 comprises an elongate element 5' passing through an orifice 21 in the core in order to connect the invisible wall 2 to the visible wall 3.

Each orifice 21 presents dimensions that are greater than the dimensions of a link element in a plane parallel to the visible wall and to the invisible wall. Under such circumstances, the link element does not exert any longitudinal or transverse force on the core, and indeed need not touch the core.

In order to avoid flattening the core, the core 20 possesses thickness 22 that, by way of example, may be less than the length 8 of the link elements 5. This length 8 represents the dimension of a link element 5 between the visible wall 3 and the invisible wall 2. For example, this length 8 lies in the range 10 millimeters (mm) to 20 mm.

Each link element may be orthogonal to the invisible wall 2 and to the visible wall 3, or it may be oblique, presenting an acute angle relative to the invisible wall 2 and/or to the visible wall 3.

Each link element 5 serves to link the visible wall 3 to the invisible wall 2 in an elevation direction, holding the visible wall 3 apart from the invisible wall 2 in elevation.

Nevertheless, these link elements do not prevent the invisible wall 2 from being decoupled from the visible wall 3 in operation.

The number of link elements may be optimized to stiffen the panel in appropriate manner while leaving the visible wall 3 free to move relative to the invisible wall 2 when the invisible wall 2 is excited by the noise source 50 at medium or high frequencies.

In particular, two adjacent link elements 5 are spaced apart by a predetermined distance 100 between link elements for achieving this purpose.

This distance 100 between link elements is preferably greater than a minimum threshold, e.g. a minimum threshold of about 15 cm.

In addition, or as an alternative, this distance 100 between link elements is advantageously less than a maximum threshold, e.g. a maximum threshold of about 50 cm.

Furthermore, the panel may have peripheral edges 30.

In the embodiment of FIG. 1, each fastener element is connected to the visible wall 3 and to the invisible wall 2.

By way of example, the two ends of each fastener element are connected respectively to the visible wall 3 and to the invisible wall 2 by damper means 10.

Each of the damper means may comprise adhesive, such as glue, for example.

Figure 2:
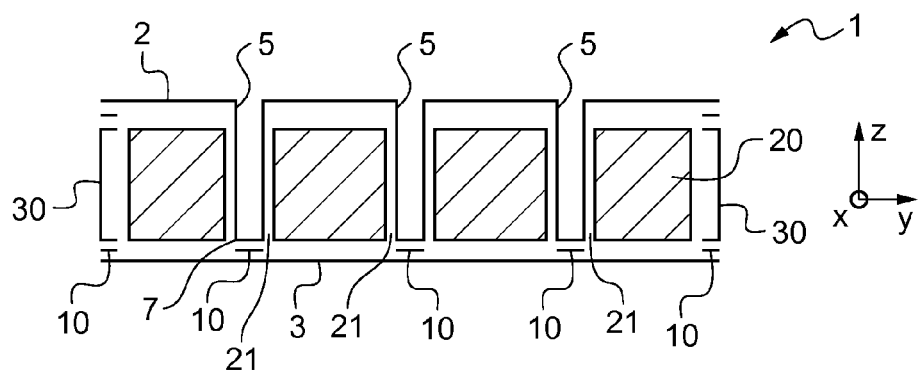
FIG. 2 is a section of a panel having fastener elements incorporated in the invisible wall.

In the embodiment of FIG. 2, each link element is an integral portion of one of said invisible and visible walls 2 and 3.

The link elements may be component portions of a single wall, and in particular of the invisible wall 2.

Under such circumstances, one of said invisible and visible walls 2 and 3, referred to as the "first wall", incorporates the link elements 5, while the other wall that is not provided with link elements is referred to as the "second wall".

Each link element thus comprises an elongate element projecting from the first wall and extending from its inner surface towards the inner structure of the second wall.

Under such circumstances, the free end of each link element is connected by damper means to the wall that does not have a link element, where such damper means may comprise an adhesive.

In the example of FIG. 2, the invisible wall 2 represents the first wall that is fitted with link elements, while the visible wall 3 represents the second wall that does not have link elements. Each link element thus comprises an elongate element projecting from the invisible wall 2 and extending from its inner first surface towards the inner second surface of the visible wall. Each link element is then connected to the visible wall 3 by an adhesive.

Independently of the embodiment, at least one end of a link element is then connected to the invisible wall 2 or to the visible wall 3.

Figure 3:
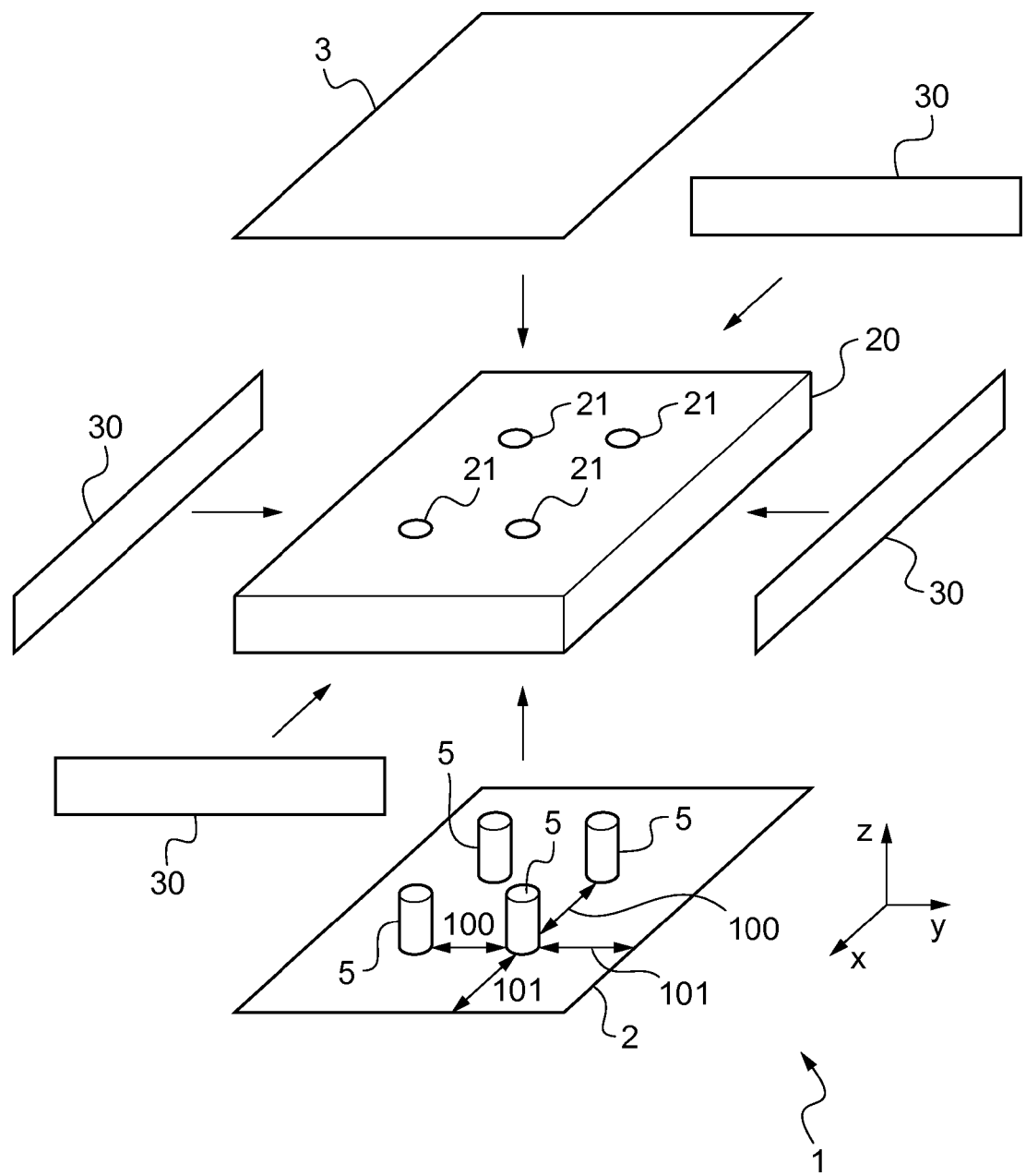
FIG. 3 is an exploded view of a panel.

FIG. 3 is an exploded view of a panel as shown in FIG. 2 in order to reveal its composition. It can be seen that the peripheral link elements of the panel are arranged at a peripheral distance 101 from the periphery of the panel, this peripheral distance possibly being less than the distance between link elements.

Figure 4:
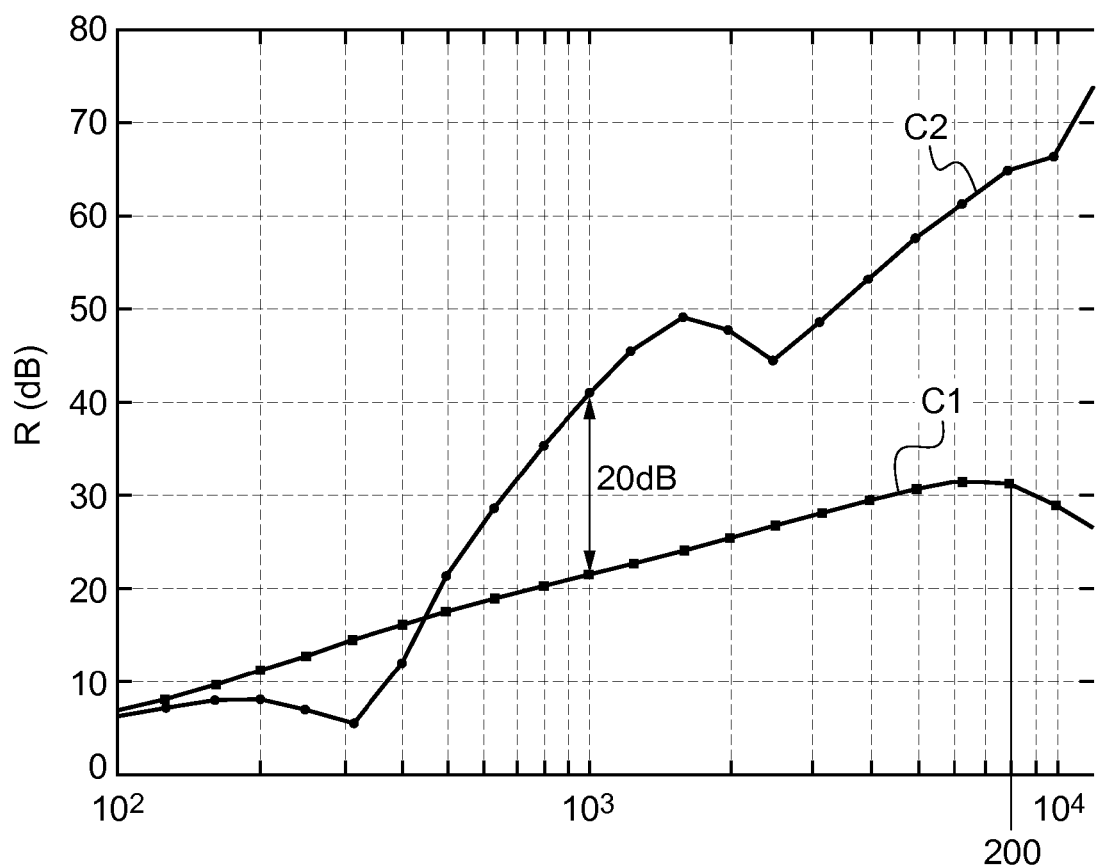
FIG. 4 is a graph showing the acoustic insulation produced by a panel of the invention.

FIG. 4 shows the acoustic attenuation that can result from using a covering of the invention.

FIG. 4 is thus a graph with frequency of vibration plotted along the abscissa axis and the acoustic attenuation provided by the panel in question plotted up the ordinate axis.

The first curve C1 thus shows the acoustic attenuation provided by a panel having a composite material sandwich structure, while the second curve C2 shows the acoustic attenuation provided by a panel of the invention for equivalent weight.

The attenuation of a simple composite material panel follows a straight line in application of the mass relationship up to the critical frequency 200 of the panel.

Conversely, the acoustic attenuation of a panel of the invention is relatively moderate at low frequencies, while on the contrary becoming perceptible for medium and high frequencies.

For equal weight, the invention thus constitutes genuine progress compared with a composite material sandwich structure.

It can be seen that the covering may tend to improve the acoustic attenuation of a panel in the medium frequency range.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A self-supporting acoustic insulation panel comprising:
a first wall facing a location to be acoustically insulated, the first wall being non-self-supporting;
a second wall facing a source of soundwaves, the second wall being non-self-supporting;
a porous core arranged between the first wall and the second wall;
a plurality of link elements, each link element extending from the second wall towards the first wall, each link element passing through an orifice in the core and being connected to the first wall and to the second wall, each link element separating the first wall from the second wall and mechanically linking the first wall and the second wall together while acoustically decoupling the first wall from the second wall; and a link damper fastening at least one end of a link element to one of the and second walls, wherein the core is not secured to the first wall or to the second wall.

2. The panel according to claim 1, wherein the core is a foam having plurality of orifices passing right through a thickness of the foam, the thickness of the foam representing the dimension of the foam between the second wall and the first wall.

3. The panel according to claim 1, wherein the core is a felt having a plurality of orifices passing right through a thickness of the felt, the thickness of the felt representing the dimension of the felt between the second wall and the first wall.

4. The panel according to claim 1, wherein one of the first or second walls is integral with the link elements, and the other of the first or second walls is not integral with the link element, the one wall having an inner surface facing another inner surface of the other wall, each link element being an elongate element projecting from the one wall and extending from the inner surface of the one wall towards the inner surface of the other wall.

5. The panel according to claim 1, wherein two adjacent link elements are spaced apart by a predetermined distance between link elements that is greater than a minimum threshold.

6. The panel according to claim 5, wherein the minimum threshold is equal to 15 cm.

7. The panel according to claim 6, wherein two adjacent link elements are spaced apart by a predetermined distance between link elements that is less than a maximum threshold.

8. The panel according to claim 7, wherein the maximum threshold is equal to 50 cm.

9. The panel according to claim 1, wherein the first wall and the second wall are walls that have been machined or molded by a non-manual forming method.

10. The panel according to claim 1, wherein at least one of the visible first and second walls is a wall of thermoformed polymer.

11. The panel according to claim 1, wherein the core presents thickness that is less than the length of the link elements, the thickness representing the dimension of the core between the first wall and the second wall, the length representing the dimension of a link element between the first wall and the second wall.

12. The panel according to claim 1, wherein the wall is micro-perforated.

13. The panel according to claim 1, wherein the first wall is parallel to the second wall.

14. The panel according to claim 1, wherein each link element is an integral portion of the second wall.

15. An aircraft, wherein the aircraft includes a panel according to claim 1.

16. The panel according to claim 1, where the damper is an adhesive.

17. A self-supporting acoustic insulation panel comprising:

a first wall facing a location to be acoustically insulated, the first wall being non-self-supporting;

a second wall facing a source of soundwaves, the second wall being non-self-supporting;

a porous core arranged between the first wall and the second wall;

a plurality of link elements, each link element extending from the second wall towards the first wall, each link element passing through an orifice in the core and being connected to the first wall and to the second wall, each link element separating the first wall from the second wall and mechanically linking the first wall and the second wall together while acoustically decoupling the first wall from the second wall; and a link damper fastening at least one end of a link element to one of the first and second walls, wherein the core presents thickness that is less than the length of the link elements, the thickness representing the dimension of the core between the first wall and the second wall, the length representing the dimension of a link element between the first wall and the second wall.

18. The panel according to claim 17, where the damper is an adhesive.

19. A self-supporting acoustic insulation panel comprising:

a non-self-supporting first wall;

a non-self-supporting second wall;

a porous core arranged between the first wall and the second wall;

a plurality of link elements, each link element extending from the second wall towards the first wall, each link element passing through the core and being connected to the first wall and to the second wall, each link element separating the first wall from the second wall and mechanically linking the first wall and the second wall together while acoustically decoupling the first wall from the second wall; and a link damper fastening at least one end of a link element to one of the first and second walls;

wherein the core is not secured to the first wall or to the second wall.

20. The panel according to claim 19, where the damper is an adhesive.

* * * * *